United States Patent
Fasano

(10) Patent No.: US 11,407,034 B2
(45) Date of Patent: Aug. 9, 2022

(54) SELECTIVE LASER MELTING SYSTEM AND METHOD OF USING SAME

(71) Applicant: OmniTek Technology Ltda., Sao Paulo (BR)

(72) Inventor: Antonio Carlos Alvarez Fasano, Sao Paulo (BR)

(73) Assignee: OmniTek Technology Ltda., Sao Paulo (BR)

( * ) Notice: Subject to any disclaimer, the term of this patent is extended or adjusted under 35 U.S.C. 154(b) by 612 days.

(21) Appl. No.: 16/026,814

(22) Filed: Jul. 3, 2018

(65) Prior Publication Data

US 2019/0009333 A1     Jan. 10, 2019

Related U.S. Application Data

(60) Provisional application No. 62/529,127, filed on Jul. 6, 2017.

(51) Int. Cl.

| | |
|---|---|
| *B29C 67/00* | (2017.01) |
| *B22F 12/00* | (2021.01) |
| *B23K 26/064* | (2014.01) |
| *B33Y 10/00* | (2015.01) |
| *B23K 26/082* | (2014.01) |
| *B23K 26/354* | (2014.01) |
| *B29C 64/241* | (2017.01) |
| *B33Y 30/00* | (2015.01) |
| *B29C 64/153* | (2017.01) |
| *B29C 64/277* | (2017.01) |
| *B22F 10/10* | (2021.01) |

(52) U.S. Cl.
CPC ............ *B22F 12/00* (2021.01); *B23K 26/064* (2015.10); *B23K 26/082* (2015.10); *B23K 26/354* (2015.10); *B29C 64/153* (2017.08); *B29C 64/241* (2017.08); *B29C 64/277* (2017.08); *B33Y 10/00* (2014.12); *B33Y 30/00* (2014.12); *B22F 10/10* (2021.01)

(58) Field of Classification Search
CPC ... B29C 64/241; B29C 64/268; B29C 64/153; B29C 64/277; B22F 10/00; B22F 12/00; B23K 26/064; B23K 26/082; B23K 26/354; B33Y 10/00; B33Y 30/00
See application file for complete search history.

(56) References Cited

U.S. PATENT DOCUMENTS

| | | |
|---|---|---|
| 5,393,482 A | 2/1995 | Benda et al. |
| 5,569,349 A | 10/1996 | Almquist et al. |
| 5,597,520 A | 1/1997 | Smalley et al. |
| 5,597,589 A | 1/1997 | Deckard |
| 5,609,812 A | 3/1997 | Childers et al. |
| 5,639,070 A | 6/1997 | Deckard |
| 5,732,323 A | 3/1998 | Nyrhilae |

(Continued)

FOREIGN PATENT DOCUMENTS

| | | |
|---|---|---|
| CA | 2338303 A1 | 2/2000 |
| CA | 2411675 A1 | 5/2003 |

(Continued)

*Primary Examiner* — Ryan M Ochylski
(74) *Attorney, Agent, or Firm* — Thompson Hine LLP

(57) ABSTRACT

A system and method for additive manufacturing by laser melting of a material. The system includes a plurality of laser heads and a powder bed surface. The laser heads are independently movable linearly across the entire powder bed surface.

5 Claims, 10 Drawing Sheets

(56) References Cited

U.S. PATENT DOCUMENTS

| | | |
|---|---|---|
| 5,733,497 A | 3/1998 | McAlea et al. |
| 5,762,856 A | 6/1998 | Hull |
| 5,932,055 A | 8/1999 | Newell et al. |
| 5,980,813 A | 11/1999 | Narang et al. |
| 6,531,304 B1 | 3/2003 | Bnnemann et al. |
| 8,728,268 B2 | 5/2014 | Zaitsu et al. |
| 9,415,443 B2 | 8/2016 | Ljungblad et al. |
| 9,746,029 B1 | 8/2017 | Mook et al. |
| 10,005,885 B2 | 6/2018 | Monsheimer et al. |
| 10,060,444 B2 | 8/2018 | Marshall et al. |
| 10,107,555 B1 | 10/2018 | Miller |
| 10,111,734 B2 | 10/2018 | Bernhard |
| 2002/0157799 A1 | 10/2002 | Sachs et al. |
| 2002/0189405 A1 | 12/2002 | Liu et al. |
| 2003/0052105 A1* | 3/2003 | Nagano .............. B23K 26/0604 219/121.83 |
| 2004/0106691 A1 | 6/2004 | Monsheimer et al. |
| 2004/0138363 A1 | 7/2004 | Baumann et al. |
| 2004/0140078 A1 | 7/2004 | Liu et al. |
| 2004/0204531 A1 | 10/2004 | Baumann et al. |
| 2005/0027047 A1 | 2/2005 | Monsheimer et al. |
| 2005/0027050 A1 | 2/2005 | Monsheimer et al. |
| 2005/0142021 A1 | 6/2005 | Aimone et al. |
| 2006/0116774 A1 | 6/2006 | Jones et al. |
| 2006/0129240 A1 | 6/2006 | Lessar et al. |
| 2006/0188650 A1 | 8/2006 | Sauer |
| 2006/0223928 A1 | 10/2006 | Monsheimer et al. |
| 2007/0007699 A1 | 1/2007 | Rynerson et al. |
| 2007/0206263 A1 | 9/2007 | Neuman et al. |
| 2008/0131479 A1 | 6/2008 | Weber et al. |
| 2008/0181982 A1 | 7/2008 | Lane |
| 2008/0194792 A1 | 8/2008 | Wang et al. |
| 2008/0195218 A1 | 8/2008 | Jones |
| 2008/0208268 A1 | 8/2008 | Bartic et al. |
| 2008/0296149 A1 | 12/2008 | Stevenson et al. |
| 2009/0208361 A1 | 8/2009 | Low et al. |
| 2009/0255102 A1 | 10/2009 | McMasters et al. |
| 2009/0287332 A1 | 11/2009 | Adusumilli et al. |
| 2009/0304497 A1 | 12/2009 | Meier et al. |
| 2009/0316965 A1 | 12/2009 | Mailling et al. |
| 2010/0286783 A1 | 11/2010 | Lechmann et al. |
| 2011/0016888 A1 | 1/2011 | HaaB et al. |
| 2011/0085900 A1 | 4/2011 | Schtz |
| 2011/0223349 A1 | 9/2011 | Scott |
| 2011/0272122 A1 | 11/2011 | Corbeil et al. |
| 2012/0222567 A1 | 9/2012 | McNeil et al. |
| 2012/0222571 A1 | 9/2012 | Byrne et al. |
| 2013/0112672 A1 | 5/2013 | Keremes et al. |
| 2013/0218163 A1 | 8/2013 | Frey |
| 2013/0224008 A1 | 8/2013 | Cheung et al. |
| 2013/0270750 A1* | 10/2013 | Green .............. B29C 64/153 264/497 |
| 2013/0296872 A1 | 11/2013 | Davison et al. |
| 2013/0310948 A1 | 11/2013 | Luscher |
| 2014/0053956 A1 | 2/2014 | Etter et al. |
| 2014/0162213 A1 | 6/2014 | Haber |
| 2014/0242400 A1 | 8/2014 | Hoebel et al. |
| 2014/0261986 A1 | 9/2014 | Lazur et al. |
| 2014/0263209 A1 | 9/2014 | Burris et al. |
| 2014/0271328 A1* | 9/2014 | Burris .................. B23K 26/127 419/53 |
| 2015/0052898 A1 | 2/2015 | Erno et al. |
| 2015/0060042 A1 | 3/2015 | Shilpiekandula et al. |
| 2015/0090138 A1 | 4/2015 | Chen et al. |
| 2015/0093283 A1 | 4/2015 | Miller et al. |
| 2015/0114071 A1 | 4/2015 | Jones et al. |
| 2015/0217405 A1* | 8/2015 | Eriksson ............... B29C 64/236 219/121.64 |
| 2015/0224699 A1 | 8/2015 | Larsen et al. |
| 2015/0283614 A1 | 10/2015 | Wu et al. |
| 2015/0375426 A1 | 12/2015 | Looije et al. |
| 2016/0061448 A1 | 3/2016 | Davenport et al. |
| 2016/0073831 A1 | 3/2016 | Wedi |
| 2016/0114432 A1 | 4/2016 | Ferrar et al. |
| 2016/0175929 A1 | 6/2016 | Colin et al. |
| 2016/0207259 A1* | 7/2016 | Fruth ..................... B28B 1/001 |
| 2016/0214280 A1 | 7/2016 | Ulemek et al. |
| 2016/0279707 A1 | 9/2016 | Mattes et al. |
| 2016/0302911 A1 | 10/2016 | Soletti |
| 2016/0303637 A1 | 10/2016 | Schleichert et al. |
| 2016/0311159 A1 | 10/2016 | Spanier et al. |
| 2016/0318129 A1 | 11/2016 | Hu |
| 2017/0021454 A1 | 1/2017 | Dallarosa et al. |
| 2017/0027624 A1 | 2/2017 | Wilson et al. |
| 2017/0049576 A1 | 2/2017 | Guilford et al. |
| 2017/0050241 A1 | 2/2017 | Thomas et al. |
| 2017/0067154 A1 | 3/2017 | Grotjohn |
| 2017/0090462 A1 | 3/2017 | Dave et al. |
| 2017/0107764 A1 | 4/2017 | Cook, III et al. |
| 2017/0173883 A1* | 6/2017 | Gray .................. B23K 26/103 |
| 2017/0191177 A1 | 7/2017 | Whitaker et al. |
| 2017/0241830 A1 | 8/2017 | Jaaskelainen |
| 2017/0292389 A1 | 10/2017 | Lrstad et al. |
| 2018/0050495 A1 | 2/2018 | Stolyarov et al. |
| 2018/0141098 A1 | 5/2018 | Fabischek |
| 2018/0207020 A1 | 7/2018 | Hart et al. |
| 2018/0207722 A1* | 7/2018 | Feldmann ............. B33Y 30/00 |
| 2018/0304369 A1 | 10/2018 | Myerberg et al. |
| 2018/0339450 A1* | 11/2018 | Franklin ............. B29C 64/245 |

FOREIGN PATENT DOCUMENTS

| | | |
|---|---|---|
| CA | 2643279 A1 | 5/2010 |
| WO | 2005066380 A1 | 7/2005 |
| WO | 2017020116 A1 | 2/2017 |
| WO | 2017040728 A1 | 3/2017 |
| WO | 2017066518 A1 | 4/2017 |
| WO | 2017127570 A1 | 7/2017 |

* cited by examiner

SELECTIVE LASER MELTING SYSTEM AND METHOD OF USING SAME

CROSS-REFERENCE TO RELATED TO APPLICATION

This application claims the benefit of U.S. Provisional Application No. 62/529,127, filed Jul. 6, 2017, the contents of which are incorporated herein by reference in their entirety.

BACKGROUND

The present invention relates to additive manufacturing and, more specifically, to systems and methods of laser-based additive manufacturing.

Traditional manufacturing techniques rely on removing material from a starting blank of the material until the desired shape is obtained. These processes are known as "subtractive" manufacturing. Alternatively, in additive manufacturing processes, the desired shaped is obtained by melting a powder form of the material layer-by-layer. This layer-by-layer approach allows for the formation of shapes not obtainable through traditional subtractive manufacturing processes.

An example additive manufacturing process is as follows. Several fixed laser heads (each powered by 100 W to 1000 W lasers) use dual galvanometer (dual mirror) deflection heads with a converging lens to reach large areas on a powder bed surface. The focused beam moves freely (X and Y dimensions) inside a specific area and follows a certain path defined by the control computer (e.g. a hatch pattern). The powder melts as the focused beam moves over the powder, thereby producing a layer of the part(s) being built. Typically, a computer controls process parameters such as laser power, scan speed, and spot size.

Traditional laser-based additive manufacturing systems suffer from several deficiencies. To allow the laser energy to access the rather large area of the powder bed in its entirety, the galvanometer heads must be far away from the powder bed. Due to the distance between the galvanometer and the powder bed, the small spot sizes needed for proper manufacture can only be achieved by carefully focusing the laser beam. Thus, only laser sources with high beam-quality can be used in traditional additive manufacturing systems, which leads to high production costs of such systems. Additionally, in order to achieve a reasonable production time, the laser power and scan speed must be high. As a consequence of the high speed, the interaction time between the laser beam and the powder is short, necessitating careful control of the process parameters, with even a small deviation from the optimal values easily leading to defects and quality control issues in the products.

Therefore, improved systems and methods of laser-based additive manufacturing are needed.

SUMMARY

In an embodiment of the invention, a system for additive manufacturing includes a powder bed surface and a laser array comprising a plurality of laser heads. Each of the plurality of laser heads is movable along one or more linear guideways across the entire powder bed surface, and each of the plurality of laser heads is movable independently of all other of the plurality of laser heads. The laser array and the powder bed surface are rotatable relative to each other.

In an embodiment of the invention, a method of additive manufacturing includes applying a first layer of a first material to a powder bed surface of an additive manufacturing system; independently moving each of a plurality of laser heads in a laser array linearly across the first material; operating a laser of each of the plurality of laser heads to melt the first material during the independent linear movement; applying a second layer of a second material to the powder bed; independently moving each of the plurality of laser heads linearly across the second material; operating a laser of each of the plurality of laser heads to melt the second material during the independent linear movement. Each of the plurality of laser heads is movable linearly across the entire powder bed surface.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
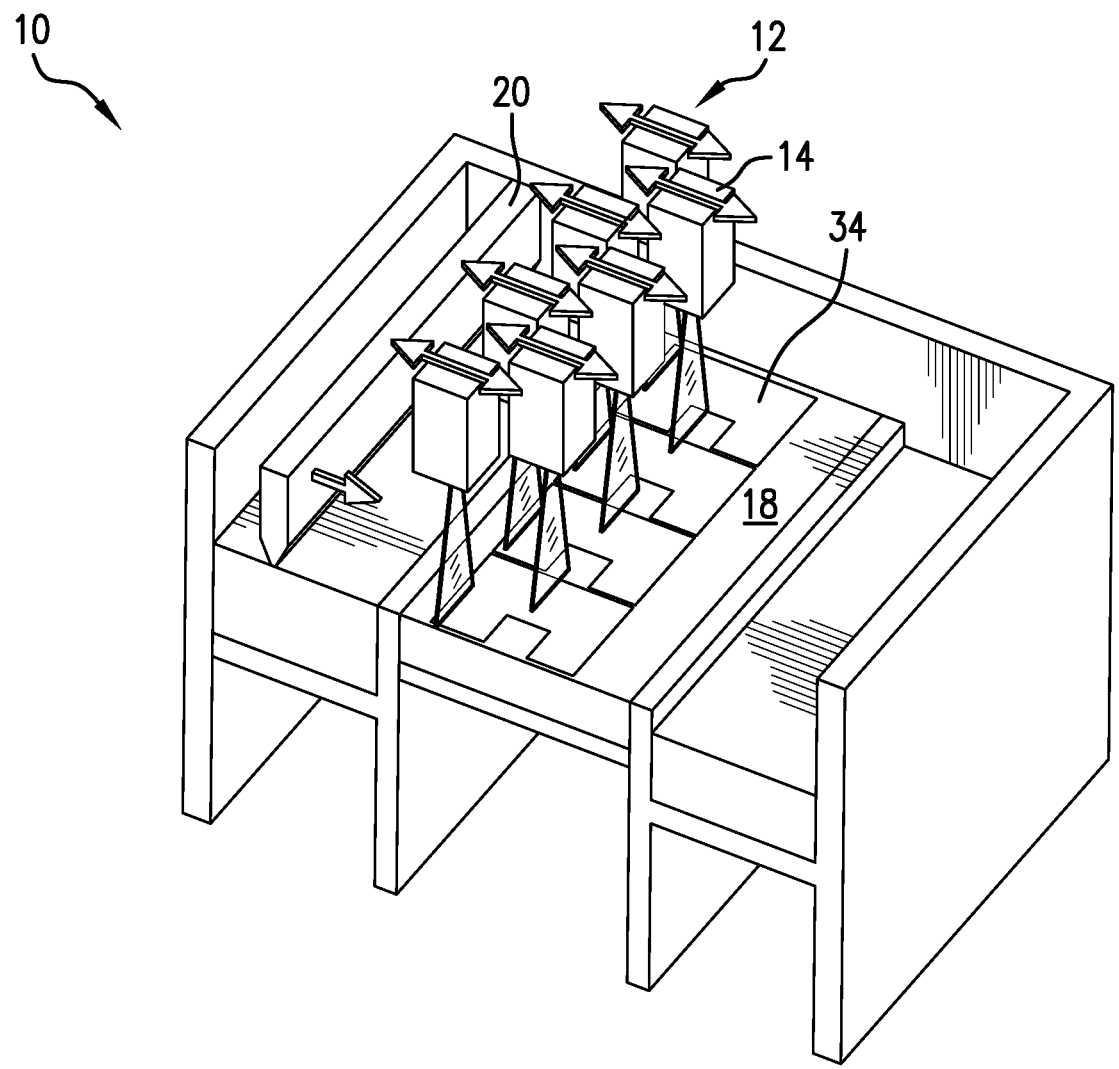
FIG. 1 is a schematic diagram of an embodiment of the additive manufacturing system.

With reference to FIG. 1 and in accordance with embodiments of the invention, a system 10 for additive manufacturing includes a laser array 12 comprising a plurality of laser heads 14, each of the plurality of laser heads 14 movable along one or more linear guideways 16 (best shown in FIGS. 2A-2D); and a powder bed surface 18. Each of the laser heads 14 is movable linearly across the powder bed surface 18 and, preferably, across the entire powder bed surface 18. Also, each of the laser heads 14 is movable independently of all the other laser heads 14.

Each laser head 14 is attached to a moving carriage (not shown) of a linear guideway 16 and may be movable using a rotary servomotor, stepper motor, ball screw, or linear servomotor. Each laser head 14 is attached to a single linear guideway 16. Thus, movement of each laser head 14 may be independent from all other laser heads 14 in the array.

Recoater 20 spreads an even layer of powder on the build area between each layer processing step. A defined amount of powder, which may rise from a powder reservoir below, or be deposited near, the recoater 20 by a linear powder feeder, is spread evenly on the powder bed surface 18.

Figure 2A:
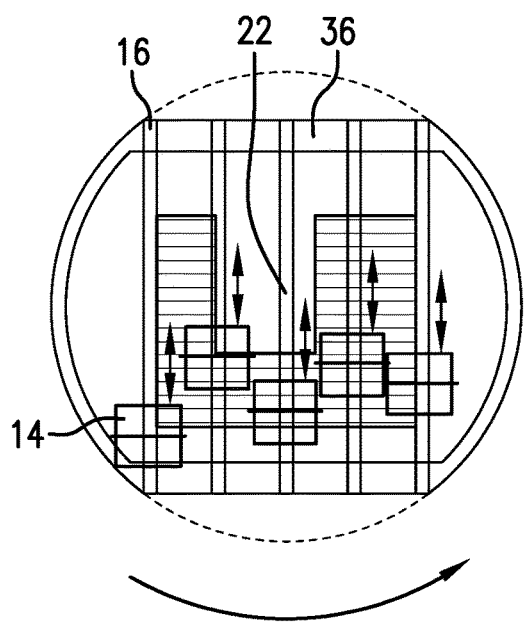
FIGS. 2A-2D show an embodiment of the additive manufacturing system that allows rotation of either the powder bed or the laser heads.
Figure 2B:
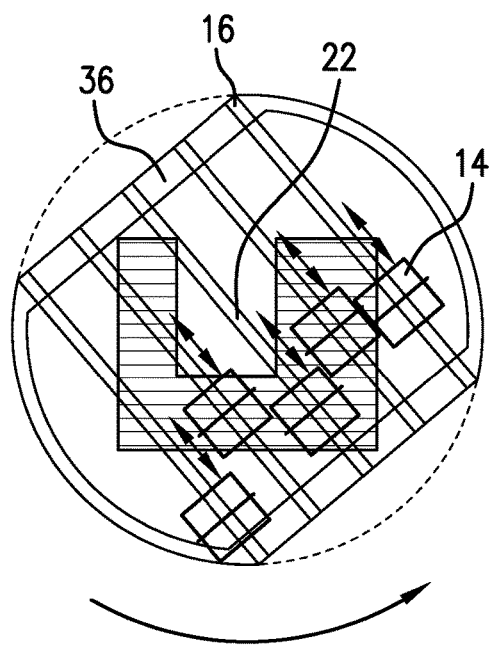
Figure 2C:
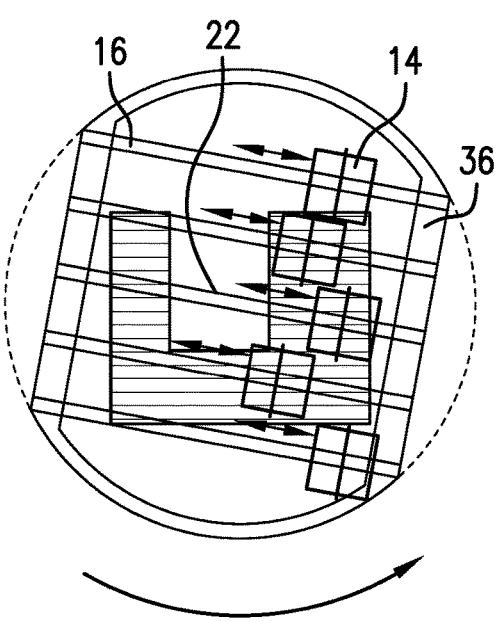
Figure 2D:
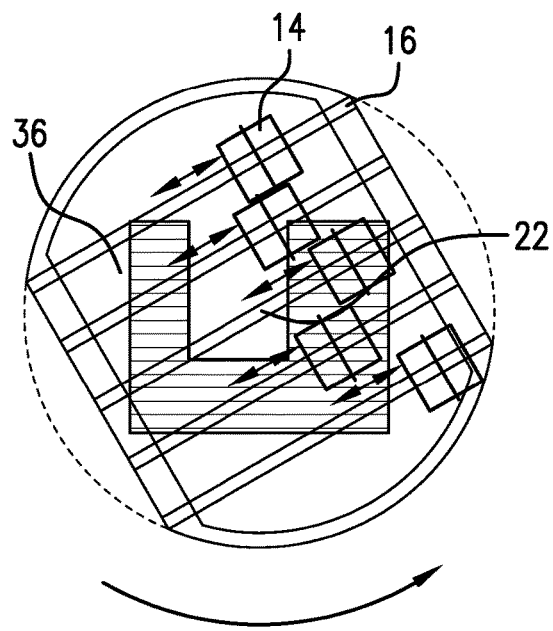

With reference to FIGS. 2A-2D in which like reference numerals refer to like features in FIG. 1, the laser array 12 may be rotatable about a central axis 22 of the laser array 12, or the powder bed surface 18 may be rotatable about a central axis (not shown) of the powder bed surface 18. In practice, rotation may be performed after each layer of deposition and melting. FIG. 2A shows operation of the laser heads 14 on the first layer of powder with the laser array 12 held stationary at a first position with an initial angular orientation. FIG. 2B shows the laser array 12 after being rotated about its axis 22 through an angular increment to a second stationary position, followed by operation of the laser heads 14 on a second layer of powder. FIG. 2C shows the laser array 12 after being rotated about its axis 22 through an angular increment to a third stationary position, followed by operation of the laser heads 14 on a third layer of powder. FIG. 2D shows the laser array 12 after being rotated about its axis 22 through an angular increment to a fourth stationary position, followed by operation of the laser heads 14 on a fourth layer of powder.

The rotation of the laser array 12 may provide products with less internal mechanical stresses, as opposed to products with all layers having lines in the same direction, which is known to create internal stresses in the finished product. Thus, scanning successive layers of the workpiece 34 in different directions lowers the residual stresses present in the material, and rotation strengthens the final sintered product.

Figure 3A:
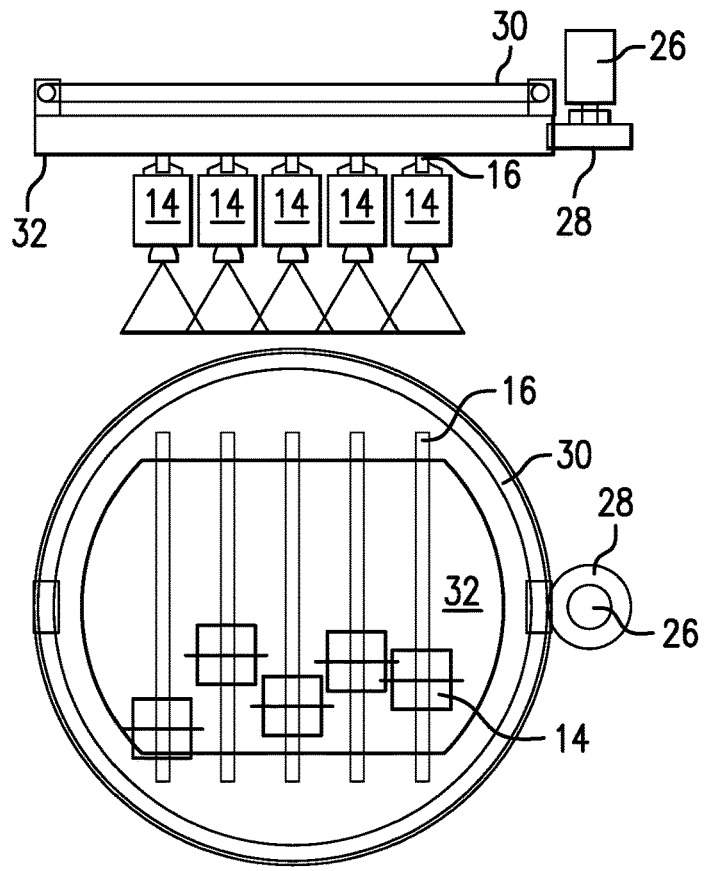
FIG. 3A is a schematic diagram of the rotation mechanism.

As shown in FIG. 3A, rotation may be accomplished using a servomotor 26 with a gear 28 on its axis driving a circular guideway 30, under which the fixture 32 for the linear guideways 16 is attached and suspended above the powder bed surface 18. In this manner, the entire laser array 12 may be rotated around a central axis.

Figure 3B:
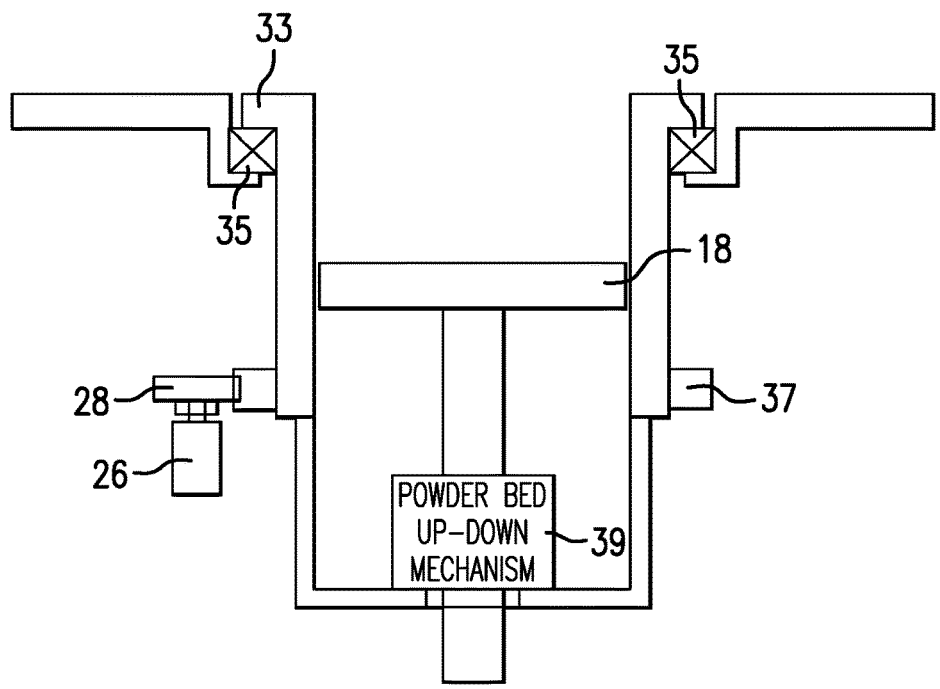
FIG. 3B is a schematic diagram of an alternative rotation mechanism.

In another embodiment, the entire powder bed may rotate. As shown in FIG. 3B, a housing 33 around powder bed surface 18 may rest on bearings 35. Servomotor 26 with driving gear 28 may then drive driven gear 37, which is attached to housing 33. In this manner, the entire powder bed surface rotates on bearings 35.

In the embodiment shown, housing 33 surrounds powder bed surface 18, and powder bed surface 18 may be raised and lowered using mechanism 39 by methods known in the art. In other embodiments, the height of the powder bed surface is fixed.

Figure 4:
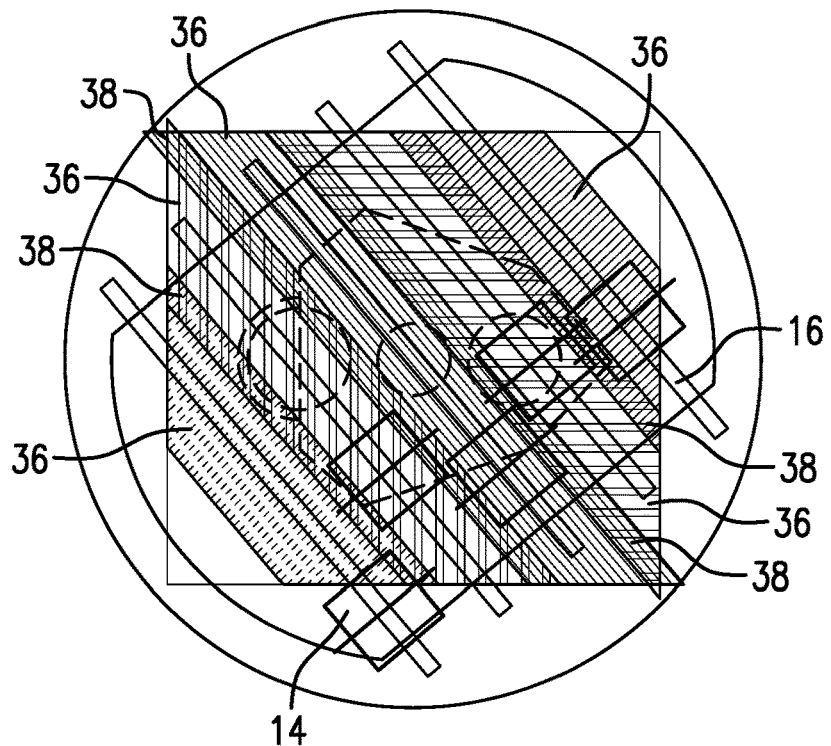
FIG. 4 is a schematic diagram of the laser light pattern.

As described above, each laser head 14 can move freely along a linear guideway 16, which enables the laser head 14 to cover a stripe-shaped area 36 on the powder bed surface 18, as shown in FIG. 4. By computer control, each laser head 14 may move along its stripe-shaped area 36 independently of the other laser heads 14. This control computer may select the stripe widths for each layer in such a way as to improve and optimize melting time for the overall process, balancing the area to be heated between laser heads 14. Each laser head 14 has a maximum possible work width. The stripe widths for each layer are selected by the control computer based on the product geometry at that specific layer. In certain embodiments, all laser heads are equally distributed. However, depending on the shape of the product, a more efficient distribution of the laser heads 14 may be advisable. In such situations, the user may redistribute the laser heads 14. The new distribution is inputted into the control computer by the user, and the software attempts to balance the stripe widths so that product processing time may be minimized.

If the control computer detects that the product to be built has much more material in the region covered by a certain laser head 14, the user may adjust the machine before beginning production by attaching an extra laser head 14 to that same linear guideway 16 to promote a faster manufacturing speed of the product in the region of that linear guideway 16. In such an embodiment, the original laser head 14 may scan only a portion of the stripe width while the additional laser head 14 may scan the rest of the stripe.

Figure 5:
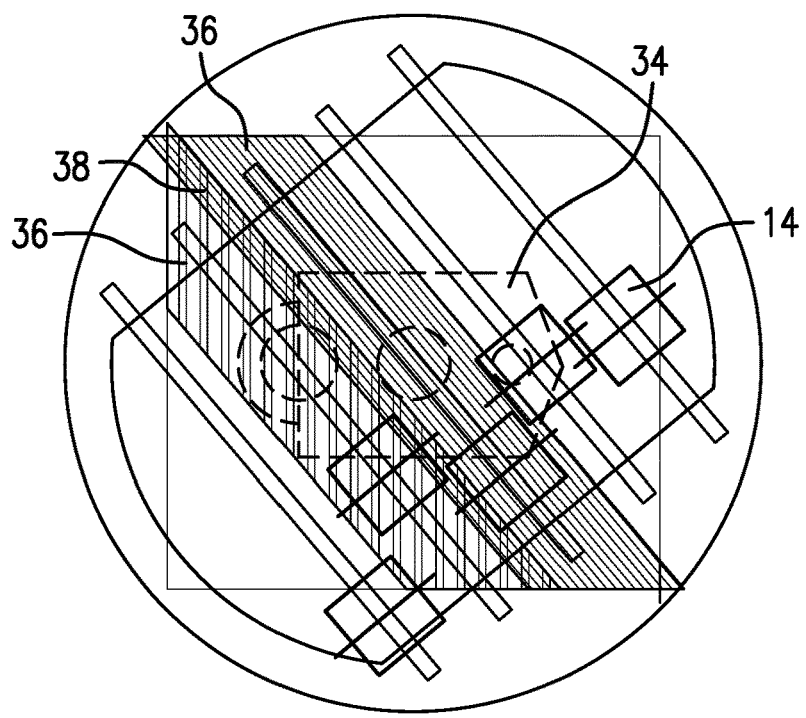
FIG. 5 is a schematic diagram of the laser light pattern.

The stripe widths can vary from layer to layer and each laser head 14 can be configured to have different stripe widths. Stripe-shaped areas 36 can superpose in order to provide the resulting manufactured article with maximum strength. In practice, the user would define the size of overlap region 38 between stripes the software should provide. The overlap region 38 between striped-shaped areas 36 from adjacent laser heads 14 causes melting between stripe-shaped areas 36 and regions of the product melted by adjacent laser heads 14 to be better bonded to each other, thus providing superior strength. See FIGS. 4 and 5.

The lenses of the additive manufacturing system 10 have much smaller focal lengths (and thus, smaller focal points) than those of traditional systems, which may allow for the use of lower power lasers and lasers with lesser beam quality, while maintaining the correct spot size.

For instance, a traditional system may have a power ranging from 400 W to 1000 W, with a focal length of about 500 mm and a spot size ranging from 0.7 mm to 0.9 mm, inclusive. In contrast, an embodiment of the presently disclosed system may have a power of about 200 W, with a focal length of about 100 mm and a spot size ranging from about 0.3 mm to about 0.9 mm, inclusive. Thus, the smaller achievable focal points of embodiments of the presently disclosed invention enable higher resolution and more detailed characteristics on the manufactured articles when compared to a traditional system.

Figure 6A:
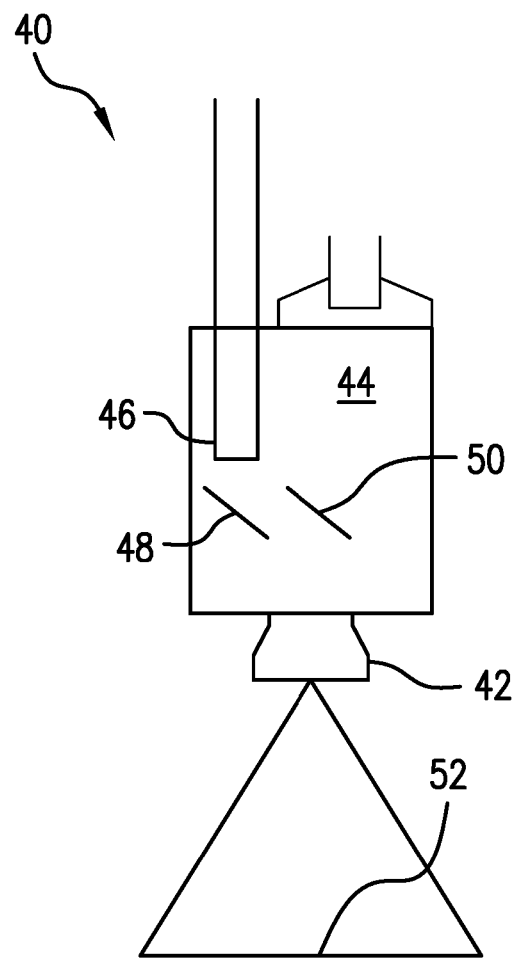
FIGS. 6A and 6B show the front and side views of a typical F-theta laser head.
Figure 6B:
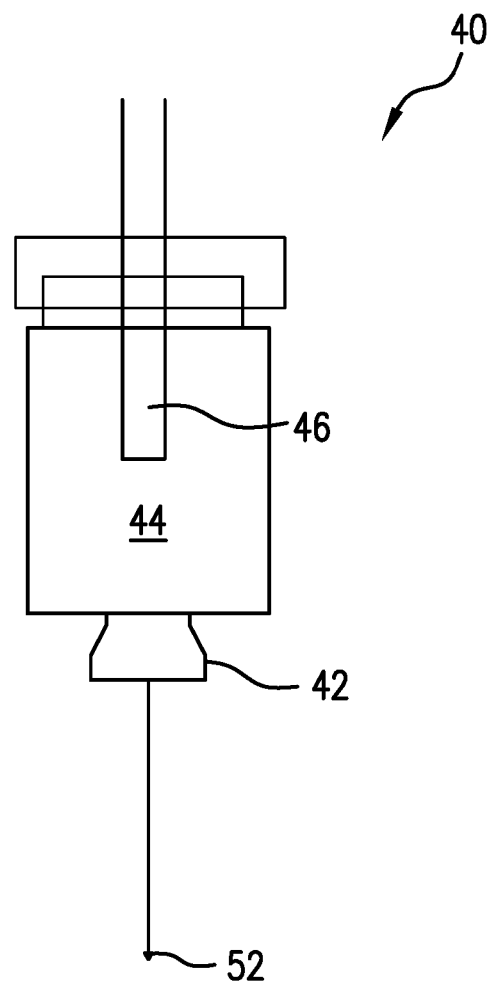

With reference to FIGS. 6A (front view) and 6B (side view), a typical laser apparatus 40 includes F-theta focal lens 42 and housing 44. Inside housing 44, laser delivery bayonet 46 supplies laser light to fixed mirror 48. Oscillating mirror 50 receives the laser light from fixed mirror 48 and transmits it to F-theta focal lens 42. Laser line 52 is produced when laser light leaving F-theta focal lens 42 is projected onto a surface.

The smaller scan lengths of the present invention also improve error correction, which in turn improves geometric accuracy. In a traditional F-theta focal lens, two galvanometers divert a laser beam onto a rectangular region, as shown in FIG. 6A. When the galvanometers are pointed to coordinates, e.g. $X_1, Y_1$ on the focal plane, the distortion induced by the F-theta lens causes the laser light to move, instead, to position $X_1', Y_1'$, which is different from $X_1, Y_1$. To correct those errors, the software on the control computer must correct the position information sent to the scanners. For each $X_1, Y_1$, there is a specific set of values $\Delta X$, $\Delta Y$ that must be added to or subtracted from the theoretical position to arrive at the correct values, which when sent to both galvanometers, will result in the correct position being achieved on the work plane. The galvanometers attempt to correct these distortions by equations or by correction tables. Equations do not always correctly calculate the errors for the entire XY plane. As for the use of correction tables, if each axis is defined by 16 bits, the total number of corrected points are 4,294,967,296 points ($2^{16} \times 2^{16}$). In contrast, in embodiments of the presently disclosed invention, one axis is controlled by a servomotor, meaning that no correction is necessary for one of the coordinates of each X,Y pair. Thus, the total number of corrections necessary for embodiments of the presently disclosed invention may be 65536 points ($2^{16}$).

To summarize, conventional galvanic mirrors move in both the x-direction and the y-direction to perform the laser scanning over an area. However, in accordance with the system described herein, movement in one direction (e.g., the x-coordinate) is provided by motion along the linear guideways 16, not by tilting the mirror, as used for the other coordinate (e.g., the y-coordinate. This reduces the need to correct for both x and y axes of mirror scanning, thus improving quality.

Figure 7:
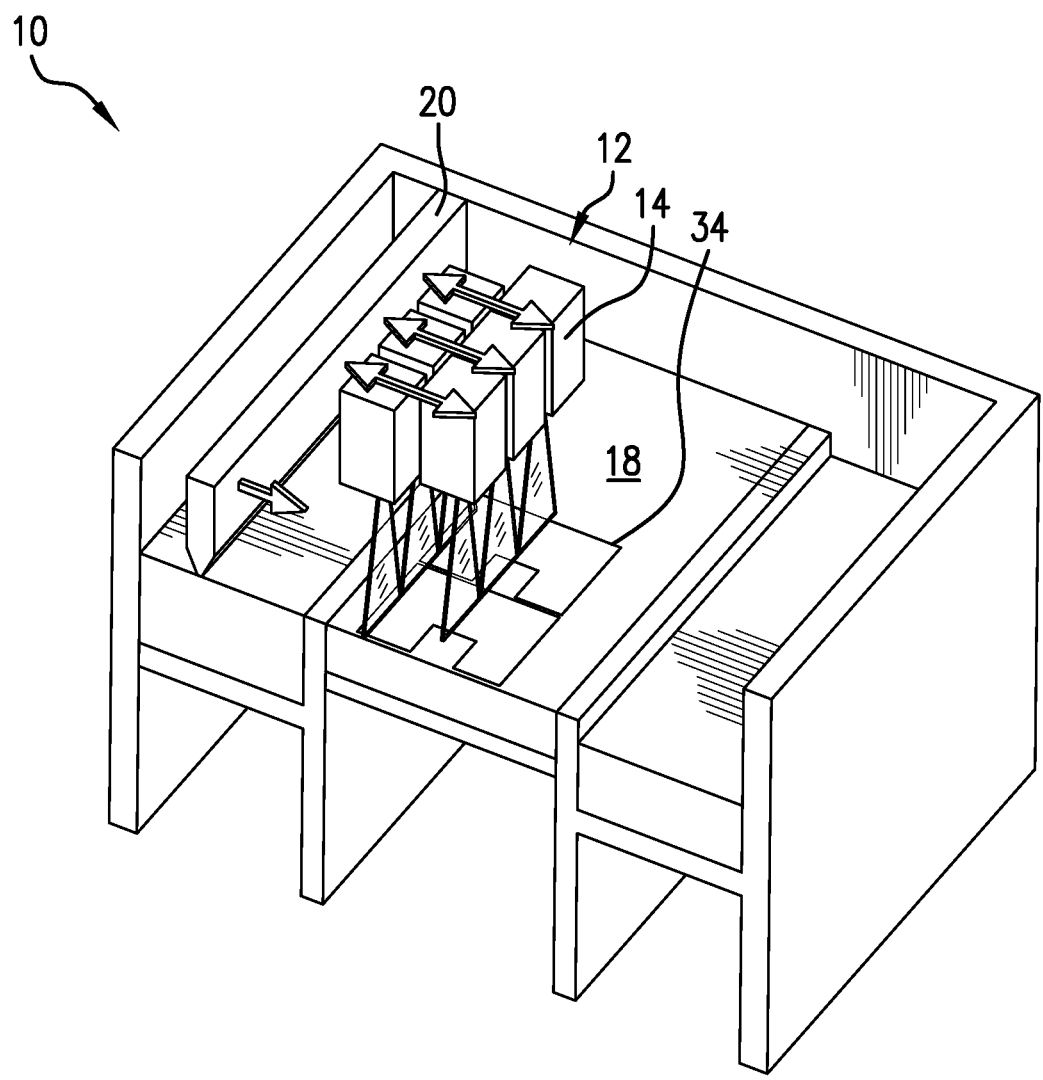
FIG. 7 is a schematic diagram of another embodiment of the additive manufacturing system.
Figure 8:
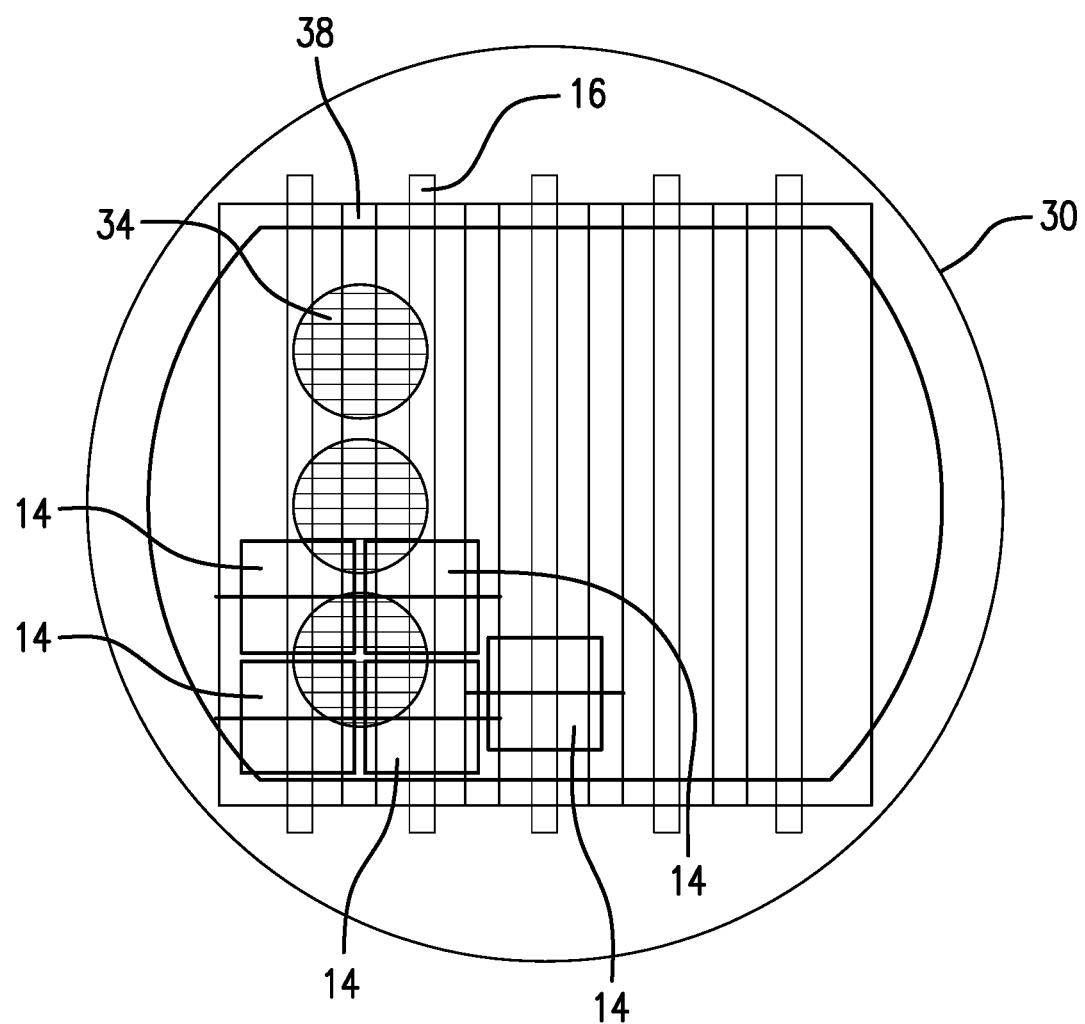
FIG. 8 is a schematic diagram of the laser head arrangement for another embodiment of the additive manufacturing system.

With reference to FIG. 7 in which like reference numerals refer to like features in FIG. 1, when the whole powder bed surface 18 is not needed to produce the desired number of manufactured articles, the laser heads 14 may be more compactly arranged and all laser heads 14 may move as one unit. Stated differently, when only a portion of the powder bed surface 18 is needed, the independent movement of the laser heads 14 may be sacrificed to allow additional stripe-shaped areas 36 over the same manufactured article, which greatly increases the speed of the build. This embodiment may be especially advantageous for manufacturing small parts. In addition, the user may manually re-position the laser heads 14 on the linear guideways 16 such that additional laser heads 14 may be used on each linear guideway 16, as described above, to achieve greater build speeds. See FIG. 8

By automatically or manually setting the distances between laser heads 14 before production, productivity of the manufactured articles may be optimized. The control computer may set the optimal distances between the laser heads 14 after analysis of design drawings of the manufactured article and distribution of the manufactured articles on the build plate.

Figure 9:
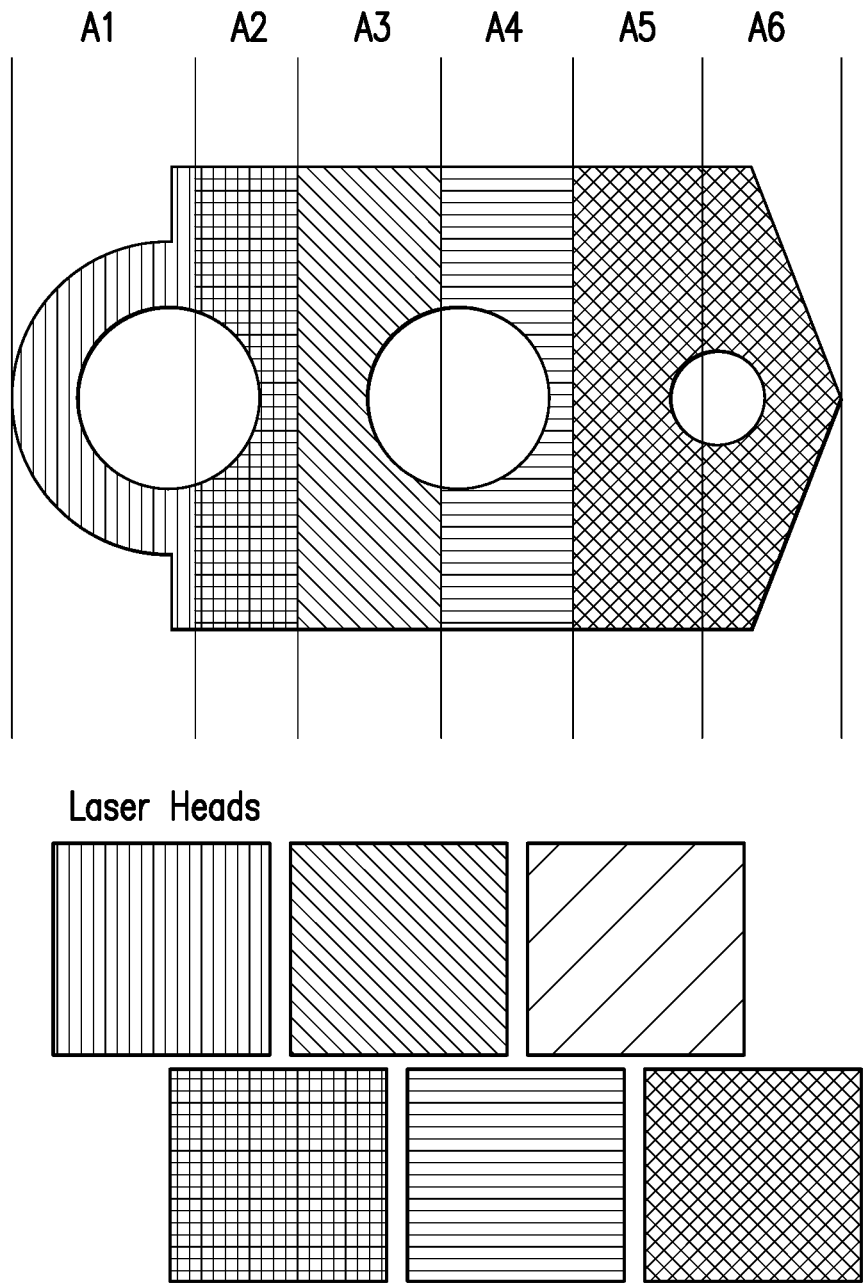
FIG. 9 is a schematic diagram of optimal stripe widths.

The control computer calculates the stripe widths based on the goal of making all the areas to be melted equal to each other, as depicted in FIG. 9. In short, software calculates the distribution in such way that the following holds for each layer: A1=A2=A3=A4=A5=A6.

Figure 10:
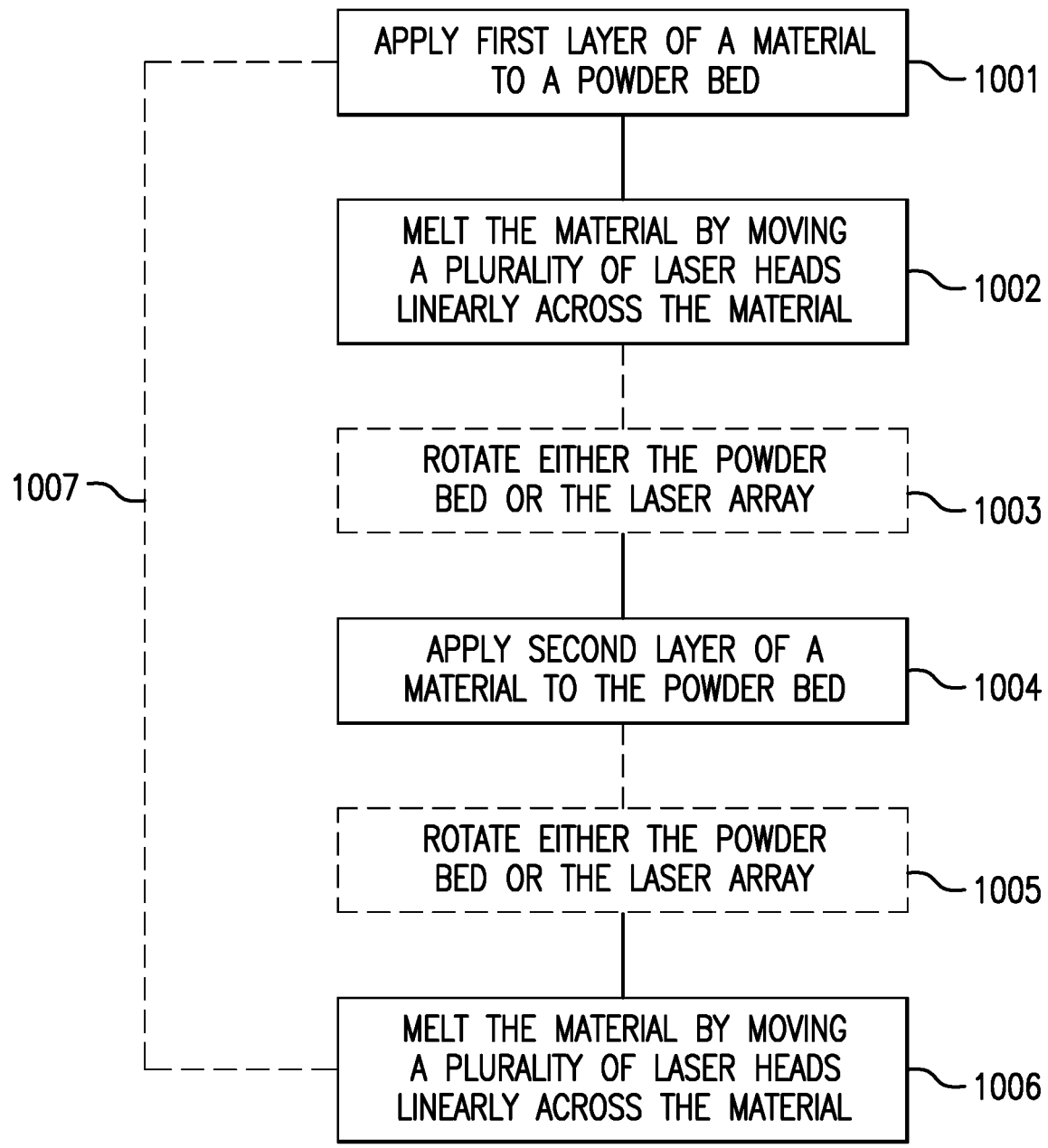
FIG. 10 is a flow chart of an embodiment of the method of additive manufacturing using the additive manufacturing system of FIG. 1.

FIG. 10 provides a flow chart for a method of additive manufacturing. In step 1001, a first layer of a material is applied to a powder bed of an additive manufacturing system.

The material for additive manufacturing may include one or more of INCONEL® 718, INCONEL® 625, titanium, stainless steel 316L, maraging steel, aluminum, cobalt-chrome alloy, and/or carbon steel, for instance.

In step 1002, the material is melted by moving a plurality of laser heads (forming a laser array) linearly across the material. The laser must provide enough energy to melt the material. For instance, to melt INCONEL® 718, the lasers must increase the temperature of the material to at least 1340° C.

In step 1003, the powder bed or laser array may be rotated about their respective central axes in an angular increment and stopped in a different stationary position having a different angular orientation. As discussed with respect to FIGS. 2A-2D, this rotation lowers residual stresses present in the material and strengthens the final sintered product.

In step 1004, a second layer of the material is applied to the powder bed. This material may be the same as the material applied in step 901, but it may also be a different material. In this way, complex, multimedia articles may be manufactured in a single additive manufacturing system. For instance, printed circuit boards (PCBs) may be manufactured with this technology. The laser sintering system may be equipped with 2 or more powder delivery components. One powder delivery component could deliver, for instance, insulating phenolic resin or an equivalent to form an insulating layer in the PCB. The other powder delivery component could deliver, for instance, conductive powder that can be melted to form the signal-conducting lines of the signal layers. Holes for the necessary communications between signal layers can be formed during the fabrication of the insulating layers. Repeating the process through several iterations of insulating layer deposition and then several iterations of conducting layer deposition may be necessary to achieve the desired thickness for the insulating layers and conductive layers. After the conductive layer is formed, the excess unused conductive powder may be removed from the surface by mechanical aspiration or an equivalent process. The laser sintering system may be configured to accomplish removal of the unused powder manually or automatically. The deposition of the insulating and conductive layers may be repeated as many times as necessary to form the desired PCB.

In one embodiment, the system may use metallic powder mixed with adhesive powder. In this way, the lasers may melt the adhesive particles, rather than the metallic particles, to cause the metallic particles to stick to one another, forming a semi-solid part. The lasers can thus operate at a much faster speed. This process may optionally be performed in a controlled gaseous environment, depending on the requirements of the specific adhesive powder chosen. After the process is completed, a solvent bath may be used to remove the adhesive and a high temperature sintering oven can then be used to cause the particles to metallurgically attach to one another, forming a solid part.

In step 1005, the powder bed or laser array may be rotated about their respective central axes.

In step 1006, the second layer of material is melted by moving the plurality of the laser heads linearly across the material. Again, the laser must provide enough energy to melt the material.

Step 1007 shows repeating the above steps until a desired product is obtained. The entire method may include an even number or odd number of melting steps. In the embodiment shown in FIG. 10, an even number of melting steps would be included; however, applying the material and melting the material need only happen until the desired manufactured article is obtained, regardless of the number of melting cycles required.

The methods as described above are used in additive manufacturing processes. The manufactured articles may include anything amenable to being formed from the material placed in the powder bed. Taken together, the independent control of the laser heads, the ability to rotate either the powder bed or the laser array, and the free mobility of the laser heads across the entire powder bed allow for rapid manufacture of strong articles that may include intricate details.

Figure 11:
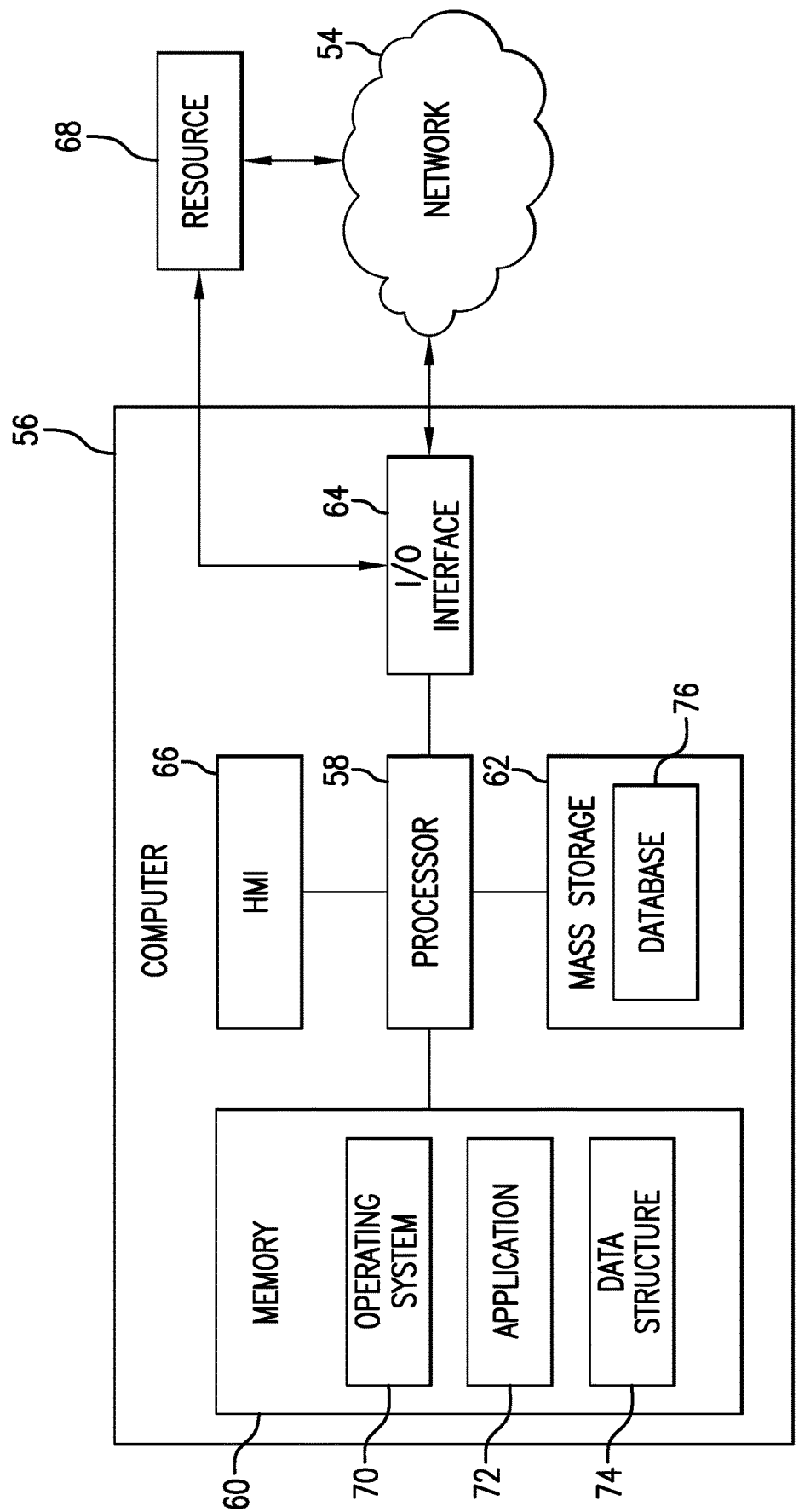
FIG. 11 is a diagrammatic view of an exemplary computer system.

Referring now to FIG. 11, the control computer described herein may be implemented on one or more computing devices or systems, such as exemplary computer system 56. The computer system 56 may include a processor 58, a memory 60, a mass storage memory device 62, an input/output (I/O) interface 64, and a Human Machine Interface (HMI) 66. The computer system 56 may also be operatively coupled to one or more external resources 68 via the network 54 or I/O interface 64. External resources may include, but are not limited to, servers, databases, mass storage devices, peripheral devices, cloud-based network services, or any other suitable computer resource that may be used by the computer system 56.

The processor 58 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 60. Memory 60 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 62 may include data storage devices such as a hard drive, optical drive, tape drive, non-volatile solid state device, or any other device capable of storing information.

Processor 58 may operate under the control of an operating system 70 that resides in memory 60. The operating system 70 may manage computer resources so that computer program code embodied as one or more computer software applications, such as an application 72 residing in memory 60, may have instructions executed by the processor 58. In an alternative embodiment, the processor 58 may execute the application 72 directly, in which case the operating system 70 may be omitted. One or more data structures 74 may also reside in memory 60, and may be used by the processor 58, operating system 70, or application 72 to store or manipulate data.

The I/O interface 64 may provide a machine interface that operatively couples the processor 58 to other devices and systems, such as the network 54 or external resource 68. The application 72 may thereby work cooperatively with the network 54 or external resource 68 by communicating via the I/O interface 64 to provide the various features, functions, applications, processes, or modules comprising embodiments of the invention. The application 72 may also have program code that is executed by one or more external resources 68, or otherwise rely on functions or signals provided by other system or network components external to the computer system 56. Indeed, given the nearly endless hardware and software configurations possible, persons having ordinary skill in the art will understand that embodiments of the invention may include applications that are located externally to the computer system 56, distributed among multiple computers or other external resources 68, or provided by computing resources (hardware and software) that are provided as a service over the network 54, such as a cloud computing service.

The HMI 66 may be operatively coupled to the processor 58 of computer system 56 in a known manner to allow a user to interact directly with the computer system 56. The HMI 66 may include video or alphanumeric displays, a touch screen, a speaker, and any other suitable audio and visual indicators capable of providing data to the user. The HMI 66 may also include input devices and controls such as an alphanumeric keyboard, a pointing device, keypads, push-buttons, control knobs, microphones, etc., capable of accepting commands or input from the user and transmitting the entered input to the processor 58.

A database 76 may reside on the mass storage memory device 62, and may be used to collect and organize data used by the various systems and modules described herein. The database 76 may include data and supporting data structures that store and organize the data. In particular, the database 76 may be arranged with any database organization or structure including, but not limited to, a relational database, a hierarchical database, a network database, or combinations thereof. A database management system in the form of a computer software application executing as instructions on the processor 58 may be used to access the information or data stored in records of the database 76 in response to a query, where a query may be dynamically determined and executed by the operating system 70, other applications 72, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for additive manufacturing, the system comprising:
    a powder bed surface;
    a laser array comprising a plurality of laser heads, each of the plurality of laser heads movable along one or more linear guideways across an entirety of the powder bed surface, and each of the plurality of laser heads movable independently of all other of the plurality of laser heads;
    a circular guideway; and
    a servomotor configured to rotate the one or more linear guideways,
    wherein the one or more linear guideways are attached to the circular guideway and suspended on the circular guideway above the powder bed surface, and the laser array is rotatable relative to the powder bed surface about a central axis of the laser array.

2. The system of claim 1, further comprising:
    a processor; and
    a computer-readable storage medium comprising instructions that upon execution by the processor cause the system to perform operations, the operations comprising:
        applying a first layer of a first material to the powder bed surface;
        independently moving each of the plurality of laser heads in the laser array linearly across the first material;
        operating a laser of each of the plurality of laser heads to melt the first material during the independent linear movement;
        applying a second layer of a second material to the powder bed surface;
        independently moving each of the plurality of laser heads linearly across the second material; and
        operating the laser of each of the plurality of laser heads to melt the second material during the independent linear movement.

3. The system of claim 2, wherein the operations performed by the system upon execution of the instructions by the processor further comprise:
    rotating the laser array relative to the powder bed surface about the central axis of the laser array.

4. The system of claim 3, wherein the operation of rotating is caused by execution of the instructions by the processor to occur before the operation of applying the second layer of the second material to the powder bed surface.

5. The system of claim 3, wherein the operation of rotating is caused by execution of the instructions by the processor to occur after the operation of applying the second layer of the second material to the powder bed surface.

* * * * *